June 29, 1965   F. E. DALTON   3,191,259

APPARATUS FOR MOUNTING BEARING ASSEMBLIES ON A SHAFT

Filed June 21, 1963   3 Sheets-Sheet 1

INVENTOR.
FRANK E. DALTON
BY
Lyon & Lyon
ATTORNEYS.

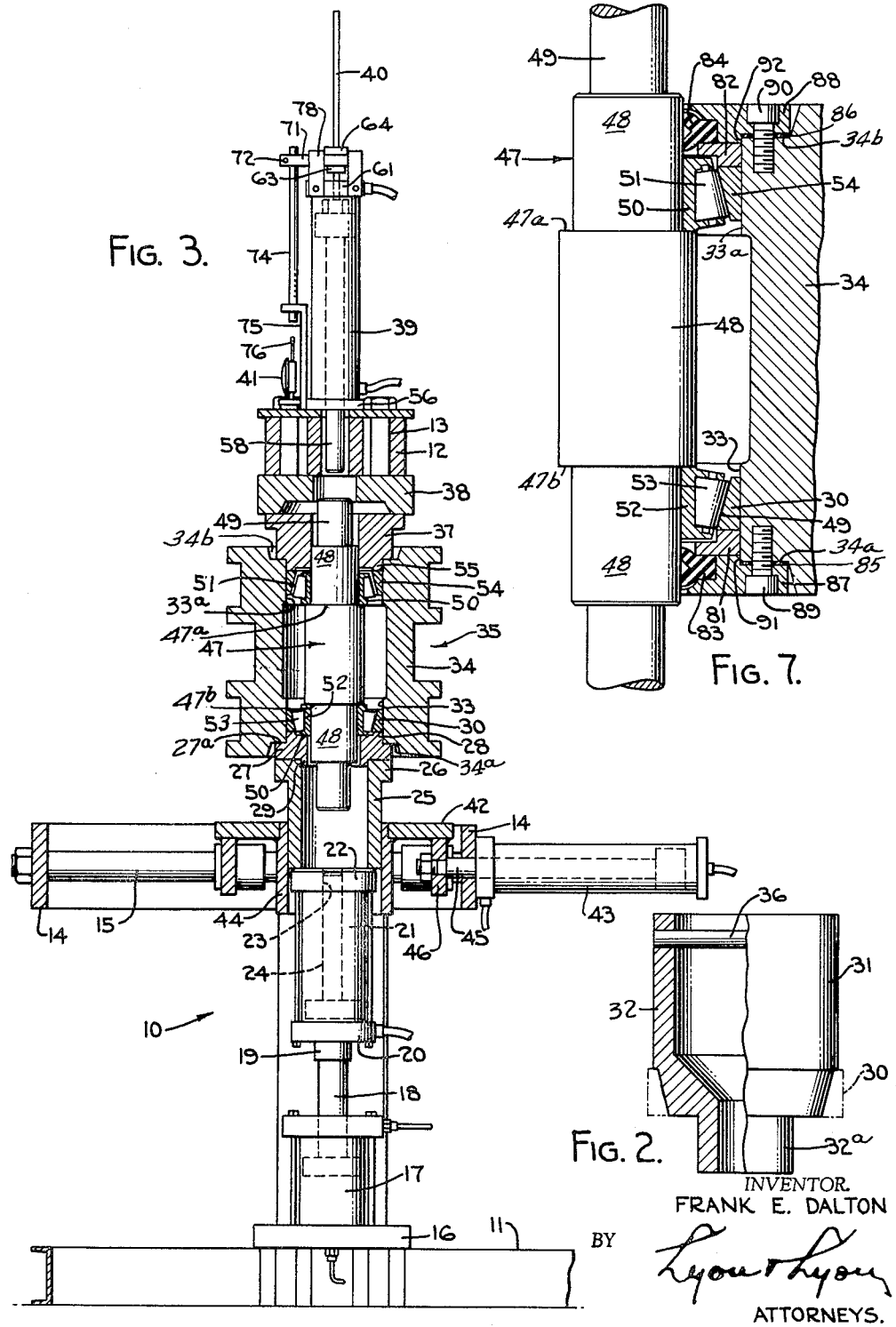

June 29, 1965

F. E. DALTON 3,191,259

APPARATUS FOR MOUNTING BEARING ASSEMBLIES ON A SHAFT

Filed June 21, 1963

INVENTOR.
FRANK E. DALTON
BY Lyon & Lyon
ATTORNEYS.

United States Patent Office 3,191,259
Patented June 29, 1965

3,191,259
APPARATUS FOR MOUNTING BEARING
ASSEMBLIES ON A SHAFT
Frank E. Dalton, 2304 Abalone Ave, Torrance, Calif.
Filed June 21, 1963, Ser. No. 289,623
4 Claims. (Cl. 29—201)

This invention relates to apparatus for mounting bearing assemblies on a shaft and more particularly relates to apparatus for mounting bearing assemblies and indicating the amount of shimming necessary to achieve proper end play. The invention will be described in connection with a roller shell for support of an endless tread of a tractor but it is to be understood that this is only by way of illustration.

Rollers such as the type used to support the treads of endless track tractors commonly comprise a shaft having a pair of axially spaced roller bearing assemblies mounted thereon for rotatably supporting the roller shell. In order that these shaft and bearing assemblies have a proper amount of end play, the roller bearings must be precisely located with respect to the bearing races mounted on the shell. In the past, this preciseness has been achieved in either of two ways. First, the shafts and shells have been precision machined so that the tolerances are determined before assembly. However, such a procedure adds great expense to the cost of manufacture because the parts cannot economically be mass produced with adequate precision. The other procedure utilized to achieve proper end play has involved the accurate measurement and tabulation of the various finished components for each assembly and the proper placing of the bearing races within the shell by means of shims cooperating with suitable end plates. This procedure is less costly than precision machining of the components but it is time consuming and thus not well adapted for mass production.

According to the present invention, it has now been found that a press can be provided which first forces the bearing races into the shell and then gives an indication of the amount of shimming necessary to properly position them with respect to the roller bearings mounted on the shaft. This is accomplished by providing a hydraulic power cylinder for inserting the races into the shell, and a pair of pneumatic devices, the first of which shifts the shaft and roller bearings with respect to the bearing races and the second of which transmits the amount of shifting movement to an indicator which can be calibrated to give an indication of the shimming necessary to provide a proper amount of end play.

It is therefore an object of the present invention to provide a device for assembling a shaft and roller bearings within a shell and for indicating the total amount of end play.

It is also an object of the present invention to provide a press which inserts a pair of bearing races within a shell and then gives an indication of the distance a shaft and roller bearing assembly mounted in said shell can move.

It is another object of the present invention to provide a press having a first device for inserting bearing races within a shell and further devices for indicating the distance a shaft and bearing assembly can move within said shell between said bearing races.

These and other objects and advantages of the present invention will become more apparent upon reference to the attached description and drawings in which:

FIGURE 2 is a front elevation, partly in section, of a guide plug used in the practice of the present invention;

FIGURE 3 is a view partly in section taken substantially along lines 3—3 of FIGURE 1;

FIGURE 7 is a sectional detail of a roller constructed in accordance with the present invention.

Figure 1:
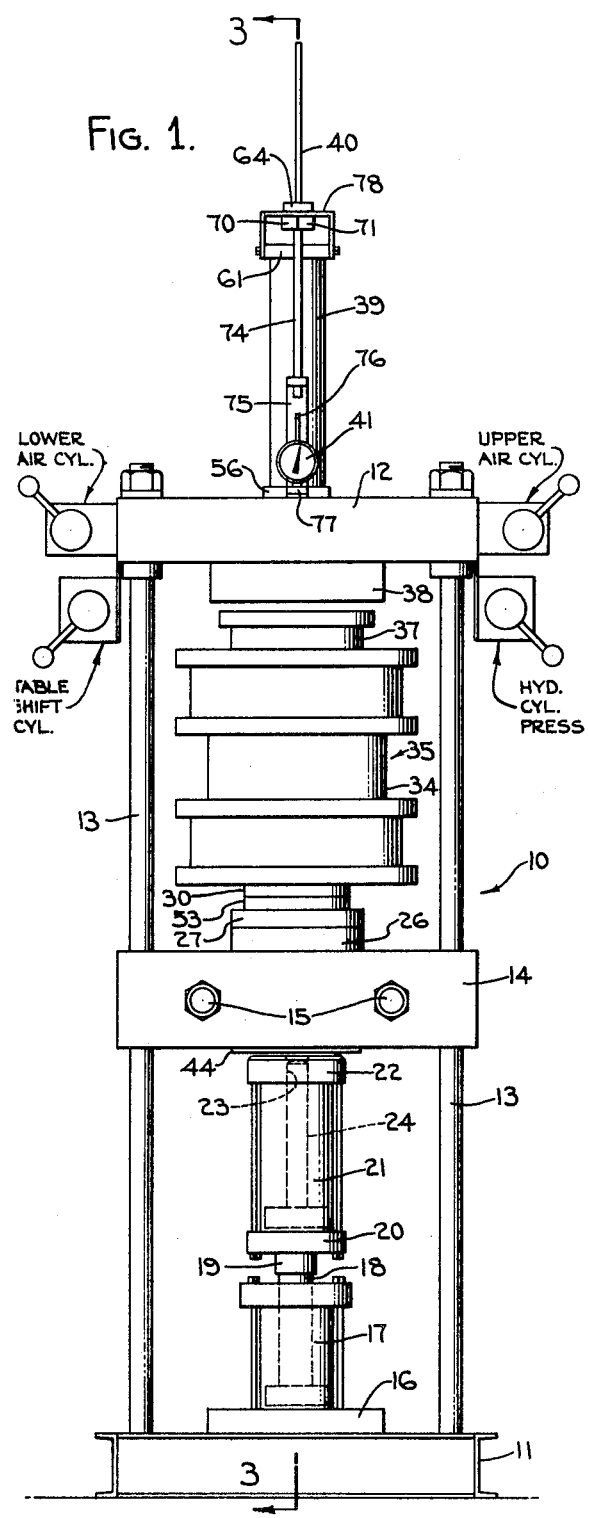
FIGURE 1 is a front elevation of the press of the present invention.

Referring now to FIGURE 1, there is shown a press generally indicated at 10, having a base 11 and a head 12 connected by a plurality of posts 13. Mounted intermediate the base 11 and head 12 on the posts 13 is a table-support 14 having a pair of table guide rails 15 for a purpose to be described hereinafter.

Mounted on the base 11 is a base plate 16 which serves as a support for a power cylinder 17, preferably hydraulic, from which extends a piston rod 18. The piston rod 18 is connected by a coupler 19 to the base 20 of a second power cylinder 21, this power cylinder being preferably pneumatic. The cylinder 21 has a top plate 22 having an aperture 23 therein through which can extend a piston rod 24 upon actuation of the cylinder 21. The top plate 22 of the cylinder 21 is adapted to engage the lower surface of a tubular spacer 25. The spacer 25 has a shoulder 26 on its upper end and this shoulder serves to support an adapter ring 27 which has a projecting part 28 on which rests an outer bearing race 30.

The adapter ring 27 also has a pilot skirt portion 29 which fits into the bore in the spacer 25 and holds the two parts in axial alignment.

The outer bearing race 30 is initially maintained in proper alignment with the axis of the adapter ring 27 by means of a guide plug 31 shown in FIGURE 2, prior to assembly of other parts. The guide plug 31 has an upper cylindrical portion 32 and a lower cylindrical portion 32a has a diameter slightly less than the diameter of the bore of the adapter ring 27 and thus serves as a pilot to maintain the guide plug 31 in proper alignment with the adapter ring 27 and the spacer 25. The upper cylindrical portion 32 has a tapered lower section 32b which telescopes into the bearing race 30 (shown in phantom) and restrains it from lateral movement relative to the press axis. The upper cylindrical portion 32 has a diameter slightly less than the minimum inside diameter of the bore 33 in the shell 34 of a roller generally indicated at 35 so that the shell can be telescoped down manually over the guide plug 31. The bearing race 30 is pressed into the bore 33 by actuating the hydraulic cylinder 17 to raise the spacer 25, adapter ring 27 and roller shell 34 to bring the upper end of the roller shell into contact with the stationary head plate 38 and to bring the shoulders 27a and 34a into contact. The shoulder 34a is provided on the shell 34 at one end of the bore 33. The surface or shoulder 27a is provided on the adapter ring 27 adjacent the projecting part 28. The guide plug 31 is provided with a cross bar 36 to enable it to be easily lifted out of the shell 34 once the bearing race 30 has been pressed into place within the bore 33. The hydraulic cylinder 17 is de-energized to lower the assembly.

A third power cylinder 39, preferably pneumatic, is mounted on the head 12 and is provided with a piston rod 40. This piston rod 40 is coupled to a suitable indicator 41 by means of a linkage to be described more fully in connection with FIGURE 4. The head is provided with a number of levers for controlling the various operations of the press.

A table 42 is mounted for movement along the table guide rails 15 and is powered by means of a shuttle cylinder 43. The table 42 is provided with a central tubular member 44 through which can pass the spacer 25 and the pneumatic cylinder 21. The shoulder 26 on the spacer 25 prevents the spacer from moving completely through the bore of the member 44. The piston rod 45 of the cylinder 43 is suitably coupled to a depending portion 46 of the table so that when the cylinder is actuated, the table 38 moves forward, or to the left as seen in FIGURE 3, carrying the spacer 25, adapter ring 27, roller 34 and guide plug 31. The guide plug 31 is then manually withdrawn.

A shaft 47 having axially aligned bearing support portions 48 and a reduced end portion 49 is provided with a first inner bearing race 50 and bearing elements 51 mounted on one support portion 48 of the shaft and a second inner bearing race 52 and bearing elements 53 mounted on the other support portion 48 of the shaft. Conventional retainers (not shown) are used to retain the bearing elements in position, and these elements cooperate with the outer bearing races to form complete bearing assemblies, generally designated 51 and 53.

A second outer bearing race 54 is now positioned above the bore 33a of the shell 34 and the adapter ring 37 positioned above the bearing race 54. The table 42 is retracted and the hydraulic cylinder 17 actuated with the result that the adapter ring 37 forces the outer bearing race 54 into the bore 33 until the shoulders 37b and 34b meet in contact. The shoulder 34b is formed on the shell 34 adjacent the bore 33a, and the surface or shoulder 37b is provided on the adapter ring 37 adjacent the projecting part 55. It can be seen that both of the outer bearing races 30 and 53 are now pressed into the bores 33 and 33a of the shell 34. Depending upon the length of the shaft 47 between abutments 47a and 47b, however, there will still remain a certain amount of end clearance between the bearing elements 53 and the outer bearing race 54. FIGURE 3 illustrates the position of the various elements at this stage in the assembling process.

Figure 4:
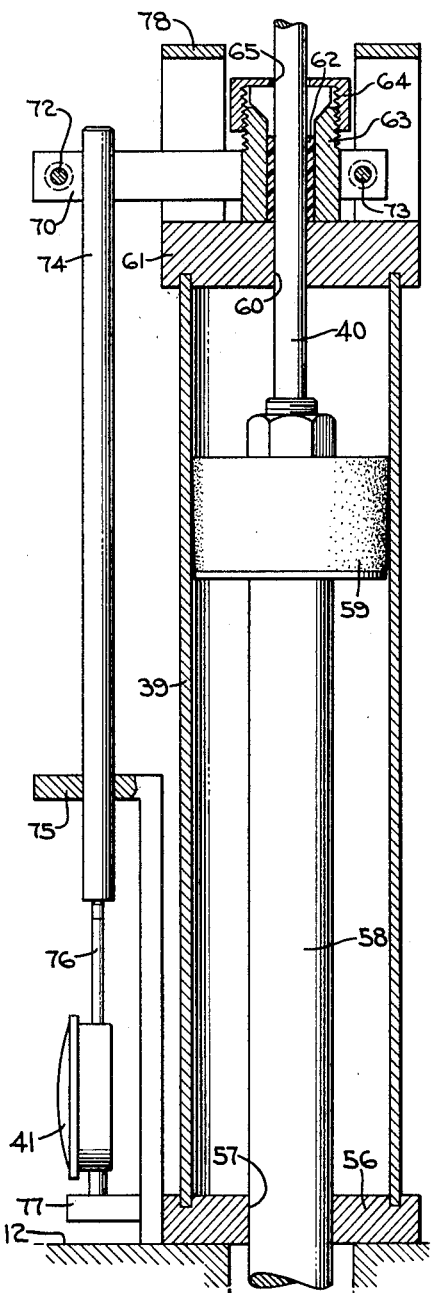
FIGURE 4 is an enlarged view, partly in section, of the indicating linkage of the present invention.

Referring now to FIGURE 4, there is shown the linkage for coupling the shaft 47 with the indicator 41 so that an indication of the amount of end play possible to the shaft may be obtained. The pneumatic cylinder 39 is fixedly attached to the top of the press head 12 and is provided with a base plate 56 having an aperture 57 therein through which may slide a piston rod 58 connected to a piston 59 which slides inside the cylinder 39. The piston rod 40 is connected to the other side of the piston 59 and is adapted to slide through a bore 60 in the top plate 61 of the cylinder 39. While the rods 58 and 40 are shown as separate elements, a single rod passing through the piston 59 may equally well be used. A nylon sleeve 62 is positioned around the portion of the piston rod 40 extending above the plate 61 and acts as a slip clutch to connect the rod 40 with a tubular sleeve 63, the nylon sleeve 62 and tubular sleeve 63 being fixedly attached together. The sleeve is provided with a cap 64 having an aperture 65 therein through which the rod 40 may freely move.

A pair of clamping bars 70 and 71 are connected together by means of suitable bolts 72 and 73 and serve to firmly clamp the sleeve 63 so that the bars 70 and 71 move with the sleeve 63. The outer ends of the bars 70 and 71 extend beyond the cylinder 39 and clamp a rod 74 which is journaled in an L-shaped member 75 and which is adapted to engage a plunger 76 extending upwardly from the indicator 41 which is mounted on a suitable support plate 77. The indicator 41 is of any well known type having an extended plunger which, when pushed into the indicator will cause the indicating hand thereof to move a distance proportional to the movement of the plunger, the plunger being spring-biased or otherwise biased out of the indicator 41. A housing 78 is mounted on the top plate 61 to limit movement of the bars 70 and 71 and thus limit the upward movement of the sleeves 63 and 62.

Figure 5:
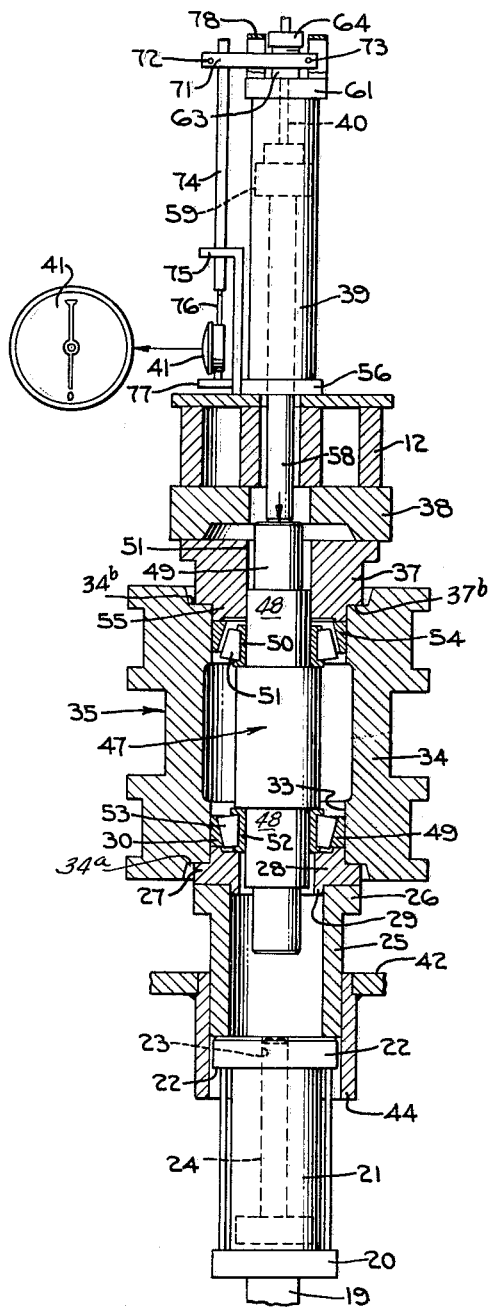
FIGURE 5 is a sectional view of a portion of the present invention in which the shaft and roller bearings of a roller are in a first position.
Figure 6:
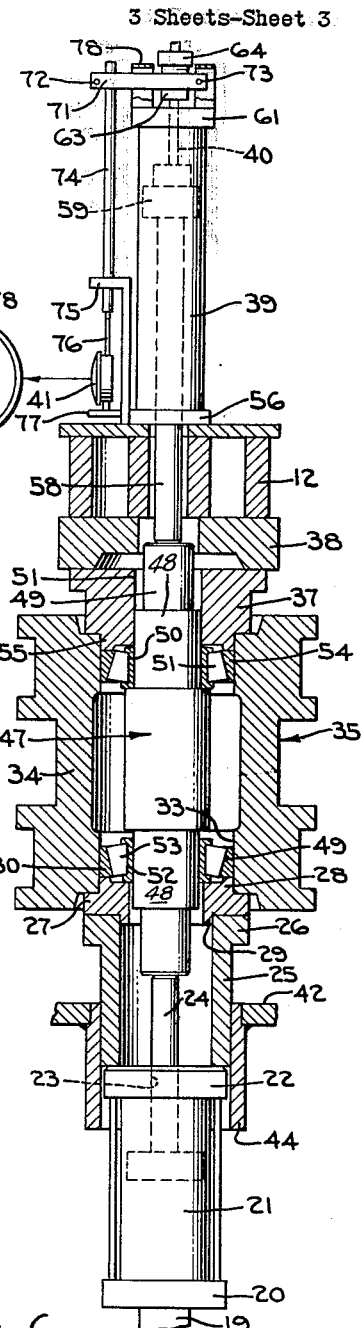
FIGURE 6 is a view similar to that of FIGURE 4 but in which the position of the shaft and roller bearings has been shifted.

The operation of the press just described will be explained in connection with FIGURES 5 and 6. As can be seen in FIGURE 5, the outer bearing races 30 and 54 have been pressed into the bore in the shell 34 as far as possible by the adapter rings 27 and 37 which have seated on the shoulders 34a and 34b. The pneumatic cylinder 39 is now actuated with the result that the piston 59 moves downwardly until the piston rod 58 contacts the top end of the upper portion 49 of the shaft 47 causing the shaft to move downwardly so that the bearing elements 53 firmly seat within the outer race 30. Movement of the piston 59 also causes the piston rod 40 to move downwardly, bringing with it the sleeve 63 by means of the nylon sleeve 62. Once the sleeve 63 engages the top plate 61 of the cylinder 39 it can no longer move downwardly but the rod 40 is able to slide within the nylon sleeve 62 until the piston 59 ceases to move. The indicator 41 is adjusted so that it will read zero when the rod 74 and plunger 76 are in this downwardmost position. In this manner, each reading always proceeds from a common reference.

The pneumatic cylinder 21 is now energized with the result that the piston rod 24 moves upwardly until it comes into contact with the lower end of the shaft 47. Inasmuch as the working area of the cylinder 21 is greater than that of the cylinder 39, the force exerted by the piston rod 24 is greater than that exerted by the piston rod 58 with the result that the shaft 47 moves upwardly until the bearing elements firmly seat within the outer bearing race 54.

The upward movement of the shaft 47 is transmitted to the piston rod 58 causing it to move upwardly and with it the piston 59 and piston rod 40. Since the upward movement of the sleeve 63 is not restrained, the force is transmitted from the rod 40 through the nylon sleeve 62 to the sleeve 63 which moves upwardly, carrying with it the clamping bars 70 and 71 and the rod 74. Upward movement of the rod 74 enables the plunger 76 to move outwardly from the indicator 41 causing the indicating arm 78 to move a distance proportional to the movement of the plunger 76. The indicating face 79 of the indicator may be calibrated in any convenient manner to indicate the distance moved by the shaft 47 and the amount of shimming necessary to adjust this distance to a proper value.

After the necessary total shimming has been determined, the roller is removed from the press and the adapter rings 27 and 37 removed from the ends of the bore in the shell 34. Suitable annular washers 81 and 82 are then inserted in either end of the bore 33, the spacers 81 and 82 being provided with shoulders for engaging the outer bearing races 30 and 54. Sealing members 83 and 84 are then positioned adjacent the spacers 81 and 82. Suitable shims 85 and 86 which, for example, may be of vinyl plastic, and which are annular in shape and have a plurality of holes for receiving suitable fastenings are then positioned on the shoulders 34a and 34b. End plates 87 and 88 are then positioned over the shims 85 and 86 and firmly pressed into place. The end plates 87 and 88 are provided with shoulders 91 and 92 which fit inside the bore 33 and engage the spacers 81 and 82. Cap screws 89 and 90 are installed to maintain the parts in assembled relationship.

From the foregoing description, it may be seen that a device has been provided which is useful not only for assembling bearing and shaft assemblies but also for indicating the amount of shimming necessary to achieve proper end play between the bearing elements and their associated outer bearing races. The device of the present invention eliminates the necessity for precisely machined parts, thereby greatly reducing the cost of their manufacture and enabling their mass production. It also eliminates the need for time consuming measurements and calculations in determining the amount of shimming necessary as it gives a direct indication of this value. Thus the proper shimming can be done by unskilled labor.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for measuring axial clearance between a shaft and axially spaced bearing assemblies for the shaft within a shell, the shell having a pair of spaced coaxial bores each with an adjacent shoulder, the shaft projecting through the bores and having axially aligned bearing support portions, each with an adjacent shoulder, the bearing assemblies each being mounted on one of the support portions of the shaft and received within one of the bores of the shell and adapted to engage an abutment, respectively, comprising in combination: a pair of adapter rings, each adapted to encircle a portion of the shaft and each having a projecting part to engage one of the bearing assemblies within its bore and having a surface to engage one of said shoulders, respectively, means for clamping the shell axially between the adapter rings with the shell shoulders engaged by said surfaces of the adapter rings, said projecting parts serving to limit axial movement of the shaft and bearing assemblies when the shell is clamped as aforesaid, means for moving the shaft axially while the shell is in clamped position, and means for measuring the extent of axial movement of the shaft.

2. Apparatus for measuring axial clearance between a shaft and axially spaced bearing assemblies for the shaft within a shell, the shell having a pair of spaced coaxial bores each with an adjacent shoulder, the shaft projecting through the bores and having axially aligned bearing support portions, each with an adjacent shoulder, the bearing assemblies each being mounted on one of the support portions of the shaft and received within one of the bores of the shell and adapted to engage an abutment, respectively, comprising in combination: a pair of adapter rings, each adapted to encircle a portion of the shaft and each having a projecting part to engage one of the bearing assemblies within its bore and having a surface to engage one of said shoulders, respectively, means for clamping the shell axially between the adapter rings with the shell shoulders engaged by said surfaces of the adapter rings, said projecting parts serving to limit axial movement of the shaft and bearing assemblies when the shell is clamped as aforesaid, means extending through one of the adapter rings for moving the shaft axially while the shell is in clamped position, and means for measuring the extent of axial movement of the shaft.

3. Apparatus for measuring axial clearance between a shaft and axially spaced bearing assemblies for the shaft within a shell, the shell having a pair of spaced coaxial bores each with an adjacent shoulder, the shaft projecting through the bores and having axially aligned bearing support portions, each with an adjacent shoulder, the bearing assemblies each being mounted on one of the support portions of the shaft and received within one of the bores of the shell and adapted to engage an abutment, respectively, comprising in combination: a pair of adapter rings, each adapted to encircle a portion of the shaft and each having a projecting part to engage one of the bearing assemblies within its bore and having a surface to engage one of said shoulders, respectively, fluid pressure means for clamping the shell axially between the adapter rings with the shell shoulders engaged by said surfaces of the adapter rings, said projecting parts serving to limit axial movement of the shaft and bearing assemblies when the shell is clamped as aforesaid, fluid pressure means including an element extending through one of the adapter rings for moving the shaft axially while the shell is in clamped position, and fluid pressure means including an element extending through the other adapter ring for measuring the extent of axial movement of the shaft.

4. Apparatus for measuring axial clearance between a shaft and axially spaced bearing assemblies for the shaft within a shell, the shell having a pair of spaced coaxial bores each with an adjacent shoulder, the shaft projecting through the bores and having axially aligned bearing support portions, each with an adjacent shoulder, the bearing assemblies each being mounted on one of the support portions of the shaft and received within one of the bores of the shell and adapted to engage an abutment, respectively, comprising in combination: a pair of adapter rings, each adapted to encircle a portion of the shaft and each having a projecting part to engage one of the bearing assemblies within its bore and having a surface to engage one of said shoulders, respectively, hydraulically operated means for clamping the shell axially between the adapter rings with the shell shoulders engaged by said surfaces of the adapter rings, said projecting parts serving to limit axial movement of the shaft and bearing assemblies when the shell is clamped as aforesaid, pneumatically operated means including an element extending through one of the adapter rings for moving the shaft axially while the shell is in clamped position, and means for measuring the extent of axial movement of the shaft.

References Cited by the Examiner

UNITED STATES PATENTS

| | | | |
|---|---|---|---|
| 1,748,971 | 3/30 | Buckwalter | 29—148.4 |
| 1,748,973 | 3/30 | Buckwalter | 29—148.4 |
| 2,210,615 | 8/40 | Brown | 29—201 |
| 2,419,280 | 4/47 | Neff | 73—37.5 X |
| 2,525,068 | 10/50 | Ericson et al. | 33—174 |
| 3,029,498 | 4/62 | Sharpe | 29—201 |

WHITMORE A. WILTZ, *Primary Examiner.*

THOMAS H. EAGER, *Examiner.*